(12) United States Patent
Rafie et al.

(10) Patent No.: US 6,392,151 B1
(45) Date of Patent: *May 21, 2002

(54) FIBER OPTIC WELL LOGGING CABLE

(75) Inventors: Saeed Rafie, Houston; Josephine Lopez, Katy, both of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,770

(22) Filed: Jan. 24, 2000

Related U.S. Application Data

(63) Continuation-in-part of application No. 09/012,334, filed on Jan. 23, 1998, now Pat. No. 6,060,662.

(51) Int. Cl.$^7$ ................................................ H01B 7/18
(52) U.S. Cl. .................................. 174/106 R; 385/113
(58) Field of Search ........................ 174/102 R, 106 R; 385/109, 110, 111, 113, 114

(56) References Cited

U.S. PATENT DOCUMENTS

| | | | |
|---|---|---|---|
| 1,999,273 A | 4/1935 | Austin | 173/13 |
| 2,222,935 A | 11/1940 | Bennett | 174/10 |
| 3,996,413 A | 12/1976 | Foord et al. | 174/23 C |
| 4,278,835 A | * 7/1981 | Jackson | 174/106 R X |
| 4,371,234 A | 2/1983 | Parfree et al. | 350/96.23 |
| 4,372,043 A | 2/1983 | Cookson | 29/828 |
| 4,676,590 A | 6/1987 | Priaroggia | 350/96.23 |
| 5,125,061 A | 6/1992 | Marlier et al. | 385/101 |
| 5,125,062 A | 6/1992 | Marlier et al. | 385/101 |
| 5,181,268 A | 1/1993 | Chien | 385/128 |
| 5,230,033 A | 7/1993 | Soodak | 385/105 |
| 5,349,137 A | 9/1994 | Cedrone | 174/76 |
| 5,358,358 A | 10/1994 | Tassone et al. | 405/154 |
| 5,463,711 A | 10/1995 | Chu | 385/101 |
| 5,574,815 A | 11/1996 | Kneeland | 385/101 |
| 5,644,105 A | 7/1997 | Castellani | 174/110 SR |
| 5,777,271 A | 7/1998 | Carlson et al. | 174/107 |
| 6,060,662 A | * 5/2000 | Rafie et al. | 174/106 R |
| 6,091,871 A | * 7/2000 | Elisson et al. | 385/113 |

OTHER PUBLICATIONS

Eric N. Randall et al.; Manufacturing and testing of armored fiber optic downhole logging cable, Sep. 1980, Wire Journal, pp. 166–168.

* cited by examiner

*Primary Examiner*—Chau N. Nguyen
(74) *Attorney, Agent, or Firm*—Madan, Mossman & Sriram, P.C.

(57) ABSTRACT

A cable includes an optical fiber and a pressure sealed enclosure surrounding the fiber. The enclosure is adapted to be able to be elongated to the maximum expected axial strain on the cable without permanent deformation. In one embodiment, the enclosure is corrugated-wall tube surrounding the optical fiber. The tube contains toroidally shaped rings within the maximum diameter portions of the corrugations in tube wall. The cable includes armor wires wound around the corrugated wall tube. In the preferred embodiment, the tube is surrounded by an elastomeric jacket, and is filled with hydraulic oil or the like to prevent entry of wellbore fluids into the tube under hydrostatic pressure. The cable may be used for well logging operations or for seismic data acquisition.

17 Claims, 4 Drawing Sheets

FIBER OPTIC WELL LOGGING CABLE

CROSS REFERENCES TO RELATED APPLICATIONS

This application is a continuation-in-part of U.S. patent application Ser. No. 09/012,334 filed on Jan. 23, 1998 now U.S. Pat. No. 6,060,662.

BACKGROUND OF THE INVENTION

1. Field of the Invention

The invention is related to the field of armored electrical cables used for downhole well logging. More specifically, the invention is related to designs for a well logging cable including optical fibers for signal communication.

2. Description of the Related Art

U.S. Pat. No. 5,495,547 issued to Rafie et al and assigned to the assignee of this invention describes limitations in the signal carrying capacity of electrical well logging cables which have only electrical conductors. The Rafie et al '547 patent discloses a well logging cable having optical fibers which can substitute for one or more of the electrical conductors in a well logging cable to increase the signal carrying capacity.

As is understood by those skilled in the art, well logging cables typically include one or more electrical conductors and armor wires which are wound around the conductors in a pattern designed to maintain a substantially round cross-sectional shape of the cable under repeated applications and relaxations of high axial tension to the cable, while also subjecting the cable to significant bending stresses. Repeated application and relaxation of axial tension and bending stresses occurs mainly as a result of lowering well logging instruments into a wellbore and later removing them from the wellbore by spooling the logging cable through various sheaves which direct the cable into the wellbore. The well logging cables known in the art having only electrical conductors provide good maintenance of the round cross-section of the cable because all of the conductors have similar tensile and bending properties.

Direct substitution of electrical conductors with optical fibers to provide a logging cable having optical fibers can result in the cable having asymmetrical tensile and bending properties, and possibly reduced resistance to deformation of the circular cross section of the cable. This can be the case even where the optical fibers are enclosed in a steel tube, as disclosed in the Rafie et al '547 patent. Furthermore, some types of well logging cables have only one electrical conductor. The electrical conductor in one conductor well logging cables is generally straight and has helically wound armor wires surrounding it. The single conductor is straight just as is the center conductor in a multi conductor well logging cable. The optical fiber/steel tube combination disclosed in the Rafie et al '547 patent is generally not applicable for conductors in the center position in multi-conductor logging cables because of the large axial strain which normally occurs on a "straight" conductor when tension is applied to the cable. For example, a combination fiber-optic/electrical well logging cable having the optical fiber enclosed in a steel tube is disclosed in U.S. Pat. No. 4,522,464 issued to Thompson et al, wherein the optical fiber enclosed in the steel tube is disposed in the center conductor position of a multiple-conductor well logging cable. A drawback to the cable disclosed in the Thompson et al '464 patent is that the steel tube used to enclose the optical fiber is subject to inelastic strain and eventual failure as a result of repeated applications and relaxations of axial tension to the cable. The tube, which is positioned in the center of the cable as disclosed in the Thompson et al '464 patent, is subject to greater axial elongation (strain) under tension than the armor wires since the armor wires are helically wound around the axis of the cable whereby elongation of the cable under tension is at least partially dissipated by unwinding of the helical lay of the armor wires as contrasted to the tube which elongates to the same degree as the change in length of the cable under tension.

Excessive axial strain on the tube may also affect another combination fiber optic/electrical well logging cable disclosed in international patent application number WO 94/28450 published under the Patent Cooperation Treaty. The cable disclosed in the WO 94/28450 application also includes an optical fiber enclosed in a metal tube positioned at the center of the cable.

At least one reference suggests using plastic instead of steel for a tube to enclose the optical fiber in a well logging cable. Plastic can have greater strain capacity to a center-located, or a single optical fiber than steel. A plastic tube, without more, is insufficient to provide optical fiber capability to a well logging cable. Another type of combination fiber/optic electrical well logging cable described in "Manufacturing and testing of armored fiber optic downhole logging cable" by Randall et al, Wire Journal, September 1980 provides a plastic-sheathed optical fiber to replace one or more of the electrical conductors in a conventional logging cable. The cable in the Randall et al article has proven commercially unacceptable for well logging because the optical fiber is subject to fluid pressure in the wellbore, since the plastic sheath around the fiber is not pressure sealed. The plastic tubing may be filled with oil in order to exclude wellbore fluids from entering the tube under hydrostatic pressure, but plastic tubes may not provide enough resistance to crushing under high bending stress or high lateral force applied to the cable.

SUMMARY OF THE INVENTION

The invention is a well logging cable including an optical fiber and a pressure sealed enclosure surrounding the fiber. The enclosure is adapted to be able to be elongated to the maximum expected axial strain on the logging cable without permanent deformation. In a preferred embodiment, the enclosure consists of a corrugated-wall steel tube. The steel tube contains toroidally shaped steel support rings within the maximum diameter portions of the corrugations in the tube wall to prevent crushing the tube under lateral "crushing" stress. The cable includes armor wires wound around the corrugated-wall tube. In the preferred embodiment of the invention, the corrugated wall tube is surrounded by an elastomeric jacket, and the tube is filled with hydraulic oil or the like to prevent entry of wellbore fluids into the tube under hydrostatic pressure.

The corrugations in the wall of the tube provide the wall of the tube with enough length relative to the expected axial strain of the logging cable so that the tube remains within its elastic limit at the maximum expected axial strain on the cable.

In another embodiment of the invention, the enclosure is a helically wound steel wire. The steel wire provides crush resistance to the optical fiber. The spacing at zero axial stress between the coils of the helically wound steel wire is the minimum to prevent coil bind at the minimum bending radius of curvature of the cable. The helically wound steel wire can be surrounded by an elastomeric jacket. The jacket can be filled with hydraulic oil or the like to prevent entry of wellbore fluids under hydrostatic pressure.

DESCRIPTION OF THE PREFERRED EMBODIMENT

Figure 1:
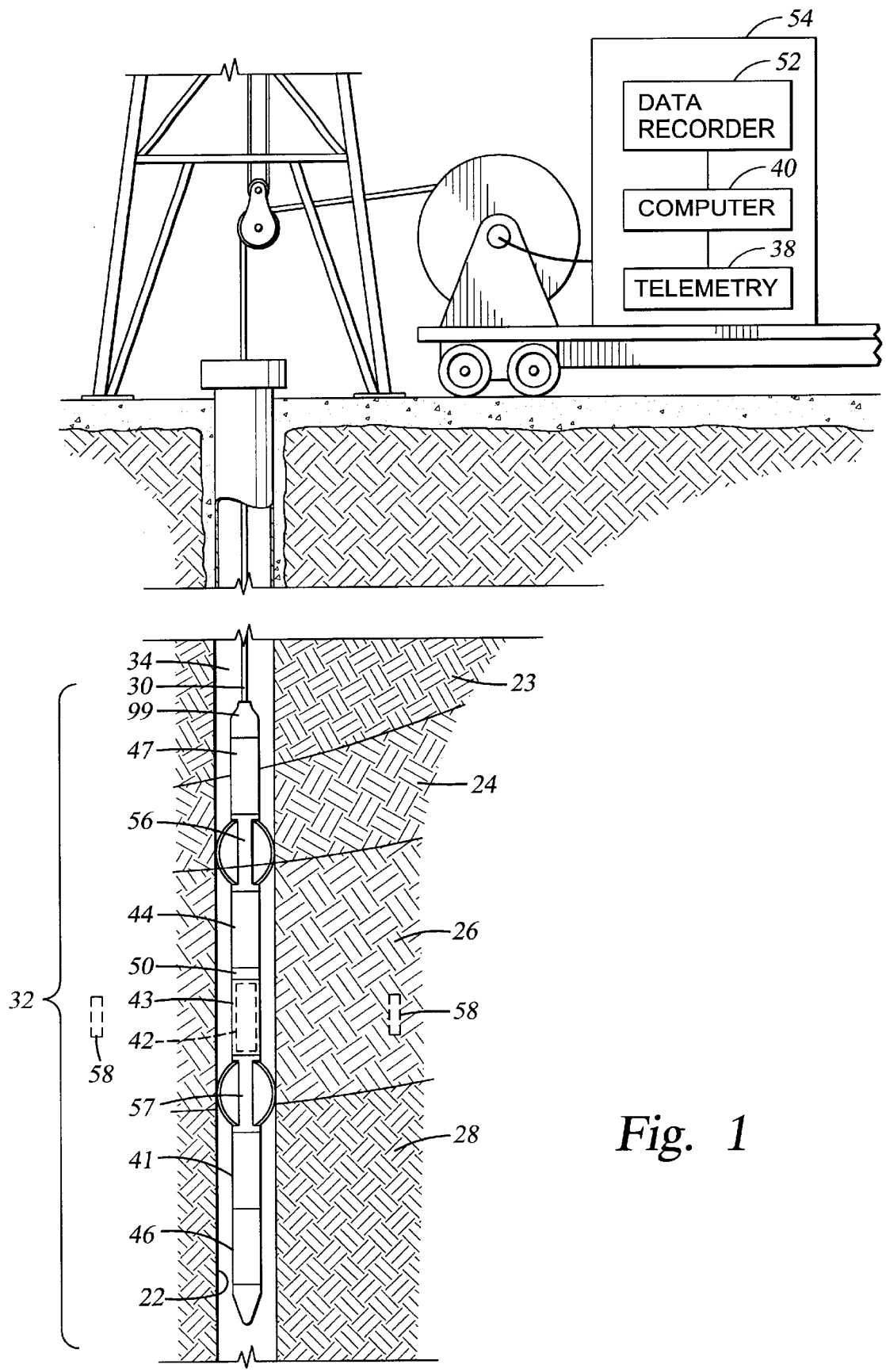
FIG. 1 shows a well logging cable carrying a sensor module disposed in a wellbore penetrating earth formations.

FIG. 1 shows a well logging apparatus disposed in a wellbore 22 penetrating earth formations 23, 24, 26, 28 for making measurements of properties of the earth formations 23, 24, 26, 28. The wellbore 22 in FIG. 1 is typically filled with a fluid 34 known in the art as "drilling mud".

A string of logging tools 32, is typically lowered into the wellbore 22 by a means of an armored electrical cable 30. The cable 30 can be spooled and unspooled from a winch or drum 48. The tool string 32 can be electrically connected to surface equipment 54 by an optical fiber (not shown separately in FIG. 1) forming part of the cable 30. The surface equipment 54 can include one part of a telemetry system 38 for communicating control signals and data to the tool string 32 and computer 40. The computer can also include a data recorder 52 for recording measurements made by the apparatus and transmitted to the surface equipment 54.

One or more probes 41, 42, 46, 47 form part of the tool string 32. The tool string 32 is preferably centered within the wellbore 22 by means of a top centralizer 56 and a bottom centralizer 57 attached to the tool string 32 at axially spaced apart locations. The centralizers 56, 57 can be of types known in the art such as bowsprings.

Circuitry for operating the probe 42 can be located within an electronics cartridge 44. The circuitry can be connected to the probe 42 through a connector 50. The probe 42 is designed to make measurements of the properties of interest of the formation and is typically located within a protective housing 43 which is designed to exclude the drilling mud 34 from the interior of the probe 42. Protective housing and electronics packages (not shown) may be provided for the other probes 41, 46, 47. The various electronics packages convert the electrical signals that are carried uphole by the optical fiber (not shown in FIG. 1).

In typical operations, as the heavy string of tools is deployed in the borehole, the cable is subjected to axial strain. This strain is, however, less than the strain that may occur when the tools string is being pulled up the borehole: occasionally, the string may get stuck in the borehole and the force required to unstick the tool may result in strains as large as 1%. The optical fiber is capable of withstanding this strain but this strain may exceed the strain limit of materials like steel.

In normal operations, crushing forces on the cable may be as large as 1200 pounds per linear inch of the cable. Optical fiber is much less resistant to these crushing forces than materials like steel. Consequently, the cable of the present invention has a configuration of the optical fiber and the steel than is able to withstand both the axial strain and the crushing forces.

Figure 2:
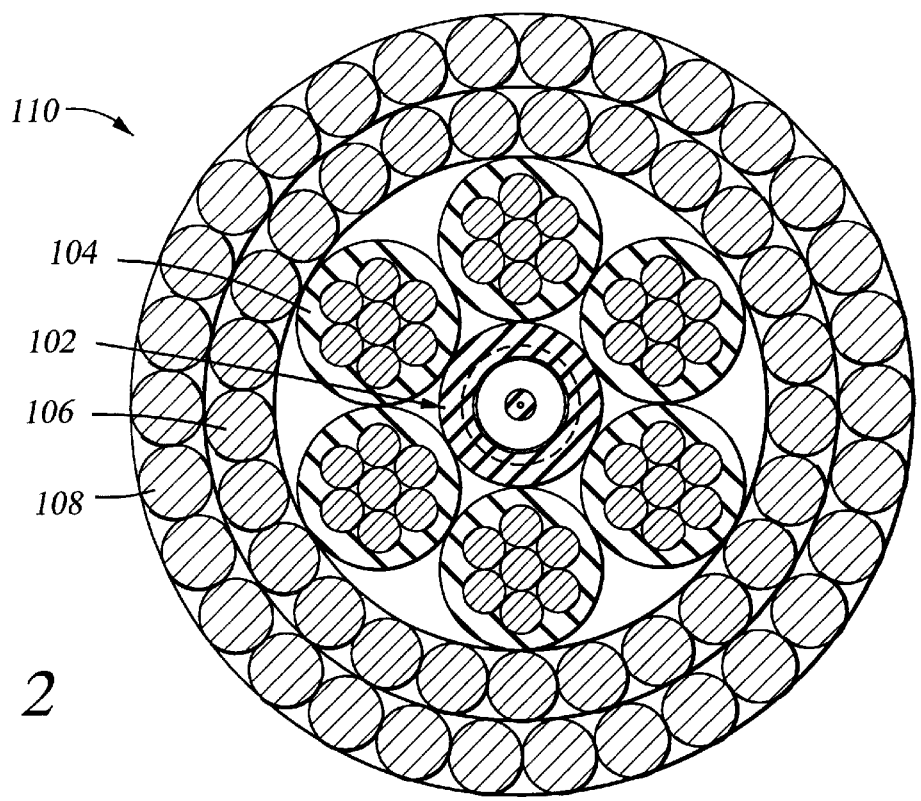
FIG. 2 shows a well logging cable including an optical fiber enclosed according to the invention located in a center conductor position in the cable.

An end view of a well logging cable according to the invention is shown in FIG. 2 at 110. The cable 110 can include a plurality of electrical conductors 104 arranged in a regular pattern. The electrical conductors 104 are surrounded by a layer of helically wound inner armor wires 106. The inner armor wires 106 are themselves surrounded by a layer of helically wound outer armor wires 108. This part of the construction of the well logging cable 110 is known in the art. An enclosed optical fiber 102 is shown in the position normally occupied by a central one of the electrical conductors 104. As is known in the art, the electrical conductor located in the center of the cable is subject to substantially the same degree of axial strain (elongation) as the overall change in length of the cable when axial tension is applied to the logging cable 110 due to the weight of the tool. Similar or greater tensions may occur when the tool is being pulled out of the borehole. Lateral "crushing" forces are applied to the cable 110 when under tension or as it bends around various sheave wheels (not shown) used for spooling the cable into the wellbore 34 in FIG. 1. These lateral forces can be partially absorbed by deformation of a plastic jacket surrounding each of the electrical conductors 104.

It should be understood that the cable 110 of the invention does not require the same number of electrical conductors 104 as shown in FIG. 2. The cable 110 may be made without any electrical conductors for particular purposes if desired. The cable 110 may in this case include only the enclosed optical fiber 102 surrounded by inner 106 and outer 108 armor wires. The enclosed optical fiber 102 may optionally include a provision to improve its electrical conductivity to be able to carry electrical power and/or electrical signals, which will be further explained.

Figure 3:
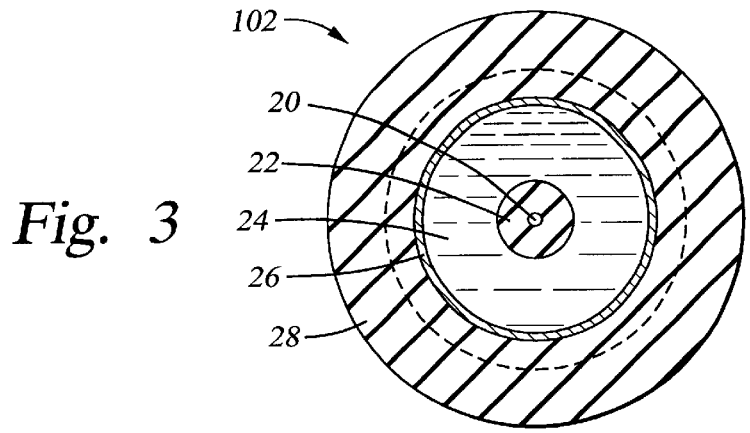
FIG. 3 shows a detailed end view of the enclosed optical fiber of the invention.

An end view of the enclosed optical fiber 102 is shown in FIG. 3. The enclosed optical fiber 102 can include one or more optical fibers 120 of types well known in the art. See for example, U.S. Pat. No 5,495,547 issued to Rafie et al or U.S. Pat. No. 4,522,464 issued to Thompson et al. The optical fiber 120 may be optionally directly surrounded by an elastomeric jacket 122 to provide resistance to abrasion of the fiber 120 against the wall of a corrugated-wall steel tube 126 in which the fiber 120 can be contained. The fiber 120 and jacket 122 can be disposed inside the steel tube 126, which can have its wall formed into a "wave" or "bellows"-like shape, which will be further explained. The tube 126 can have a minimum internal diameter sufficiently greater than the outside diameter of the jacket 122 to enable free movement of the jacket 122 inside the tube 126. The annular space between the tube 126 and the jacket 122 can be filled with a chemically and thermally inert liquid 24 such as hydraulic oil or the like to prevent entry under hydrostatic pressure of fluids (not shown) inside the wellbore (not shown) into which the cable (110 in FIG. 2) is inserted for well logging operations. The tube 126 may be covered with an elastomeric outer jacket 128 having an outside diameter similar to that of a typical electrical conductor used in well logging cables (generally on the order of 0.08 to 0.09 inches). The outer jacket 128 can absorb a small amount of lateral crushing and enables a small amount of lateral movement of the tube 126 within the outer jacket 128 under lateral strain to reduce the possibility of crushing the tube 126.

Figure 4:
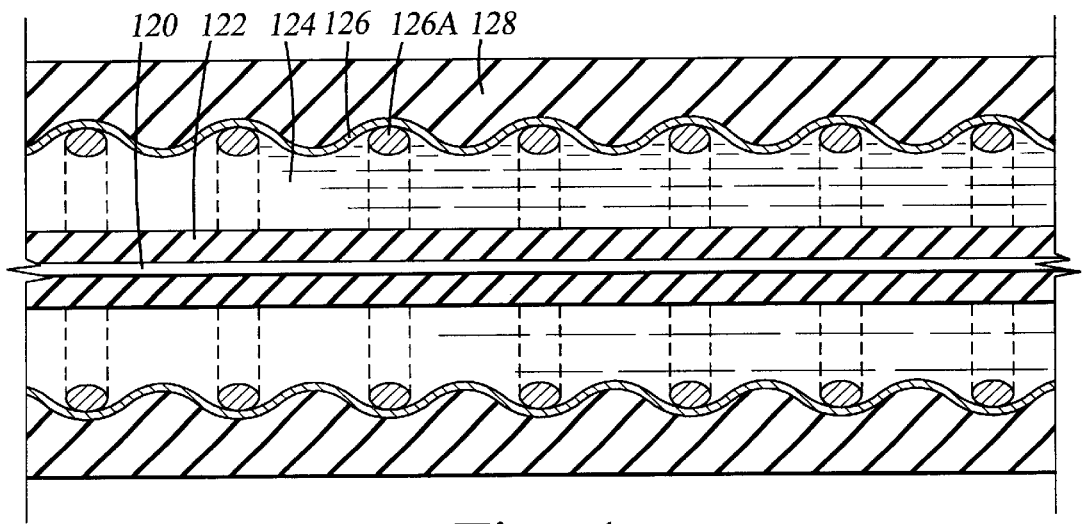
FIGS. 4 and 5 show a cross-sectional view of the enclosed optical fiber of the invention.
Figure 5:
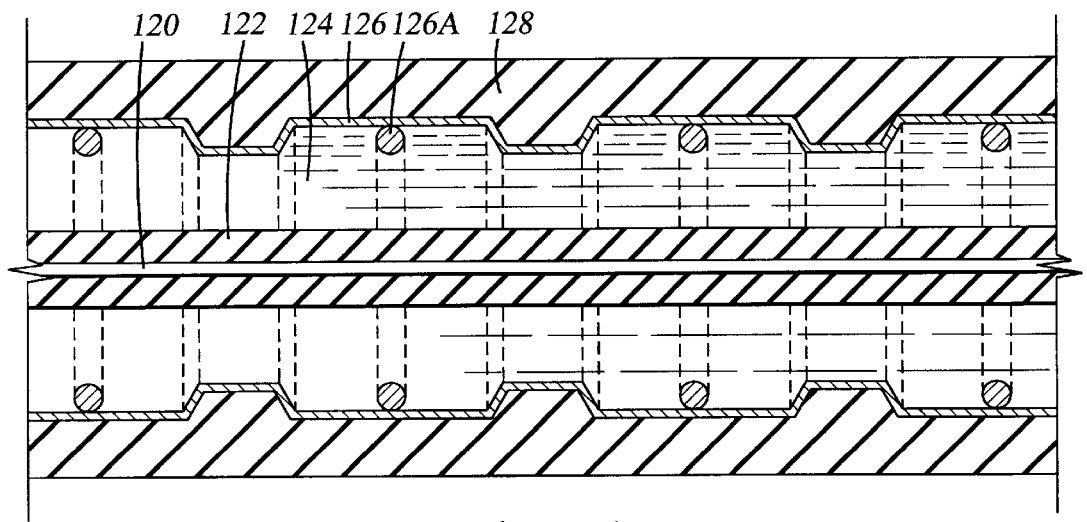

One possible shape for the corrugated-wall tube 126 is shown in a cross-section of the enclosed fiber 102 in FIG. 4. The wall of the tube 126 can be formed into "wave"-like shapes having interior curvatures suitable for inclusion of solid, toroidally-shaped "rings" 126A into the interior curves of the "waves" in the wall of the tube 126. The rings 126A provide a high degree of resistance to crushing the tube 126 under large lateral stress such as can occur when bending the loaging cable (110 in FIG. 2) over sheave wheels or the like. The "wave" shape for the corrugated-wall tube 126 shown in FIG. 4 is not the only suitable shape for the tube 126. FIG. 5 shows an alternative shape for the tube 126 wherein the tube wall is formed into a "bellows"-like shape. The tube 126 shown in FIG. 5 can include the rings 126A as for the tube in FIG. 4 to provide crush resistance under lateral strain.

The purpose of the corrugation of the wall of the tube into the "wave" shape shown in FIG. 4 or into the "bellows" shape shown in FIG. 5, is to provide the tube 126 with an actual tube length that is greater than the overall length of the enclosed fiber 102. The enclosed fiber 102, as previously explained, will be stretched to substantially the same degree as the overall change in length of the logging cable (110 in FIG. 2) under axial tension. The axial strain on the logging cable can be as much as 1 percent under the maximum permissible axial tension on the cable, as is known in the art. With the actual tube length being greater than the axial length of the cable, the strain on the wall is typically 0.5%, compared to the 1% elongation of the cable. The actual length of the wall of the tube 126 provided by the "wave" shape shown in FIG. 4 or the "bellows" shape shown in FIG. 5 is preferably enough so that the tube 126 will remain well within its elastic limit at the maximum expected axial strain on the cable under tension to avoid deforming the tube 126. The rings 126A should have sufficient thickness to avoid being crushed under the maximum expected lateral (bending and crushing) forces to be applied to the logging cable (110 in FIG. 2) during use.

A preferred material for the tube 126 is stainless steel. See for example U.S. Pat. No. 5,495,547 issued to Rafie et al. Stainless steel is preferred because of its strength and resistance to corrosion, but is not the only material which is suitable for the tube 126. Considerations in selecting appropriate material for the tube 126 include flexibility, tensile strength, shear strength, resistance to corrosion, and ability to withstand the maximum expected temperature to which the logging cable is to be exposed.

Figure 6:
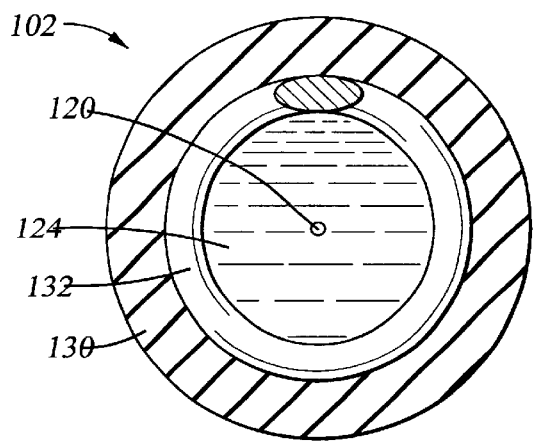
FIG. 6 shows a detailed end view of an alternative embodiment of the enclosed fiber of the invention.
Figure 7:
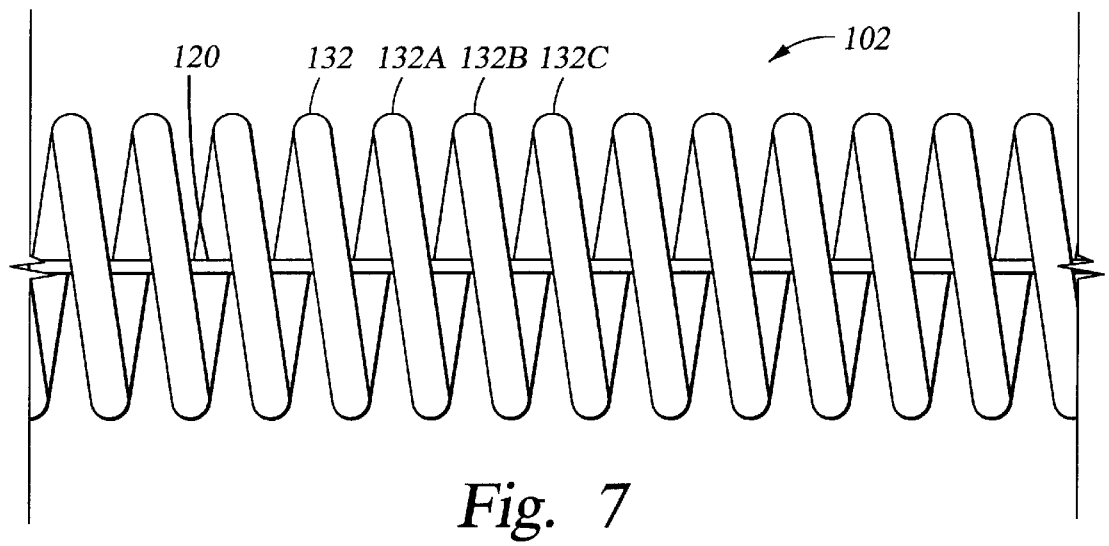
FIGS. 7 and 8 show a cross-sectional view of the alternative embodiment of the enclosed optical fiber of the invention.

FIG. 7 shows an alternative embodiment of the enclosed optical fiber 102. The optical fiber 120 may be surrounded by a helically wound steel wire 132. The helical winding makes its total length greater than the axial length of the cable, so that its strain is less than the total axial deformation of the cable, as with the corrugated design discussed above. The steel wire should have a wire diameter large enough so that the wound wire 132 has sufficient crush resistance to withstand the maximum lateral force expected to be applied to the logging cable. The helically wound wire 132 can be covered on its exterior by an elastomeric jacket 30. The annular space between the jacket 130 and the optical fiber 120 is preferably filled a liquid 124 such as hydraulic oil or the like to prevent entry of fluids from the wellbore under hydrostatic pressure. A cross-section of the alternative embodiment of the enclosed optical fiber 102 is shown in FIG. 7 without the outer jacket (130 in FIG. 6), and in FIG. 8 with the outer jacket 130. In FIG. 7, the wire 132 is preferably wound so that the spacing between the individual coils 132A, 132B, 132C under zero axial tension is no more than is needed to compensate for bending the cable (110 in FIG. 2) to its minimum allowable radius of curvature. The spacing can generally be defined as that which prevents "coil bind", where the individual coils 132A, 132B, 132C come into contact with each other as the cable is bent. Although shown in FIG. 7 as passing substantially straight through the wound wire 132, the optical fiber 120 preferably includes enough slack to prevent its being axially stretched when the logging cable (110 in FIG. 2) is subjected to its maximum expected axial strain.

Figure 8:
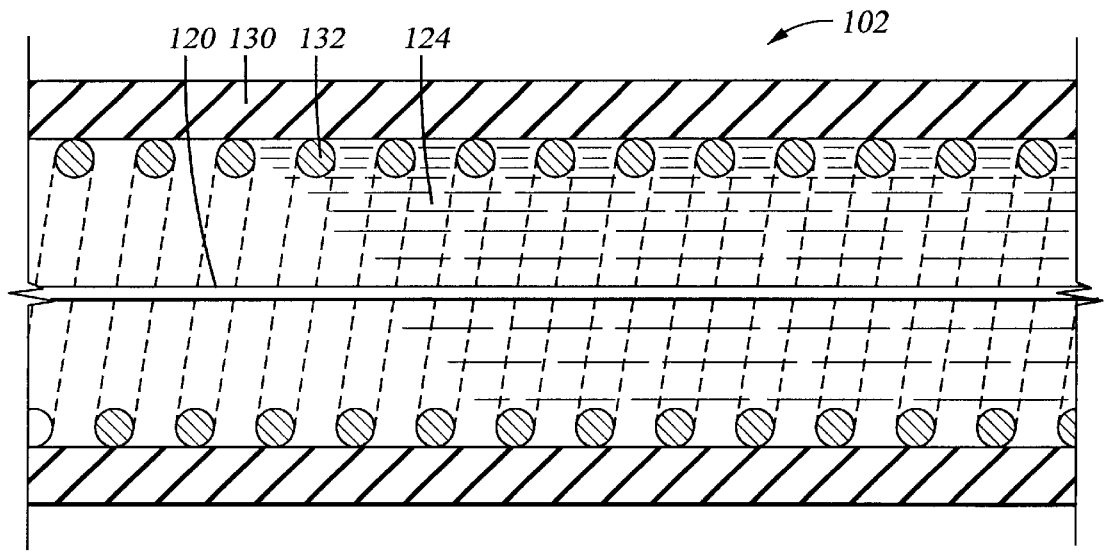

The alternative embodiment of the enclosed fiber 102 is shown in FIG. 8 with its outer jacket 130 applied to the exterior of the wound steel wire 132. As previously explained, the jacket 130 provides containment for a fluid 124 filling the annular space between the wire 132 and the fiber 120 so that fluids in the wellbore will not enter the enclosed fiber 102 under hydrostatic pressure.

Figure 9:
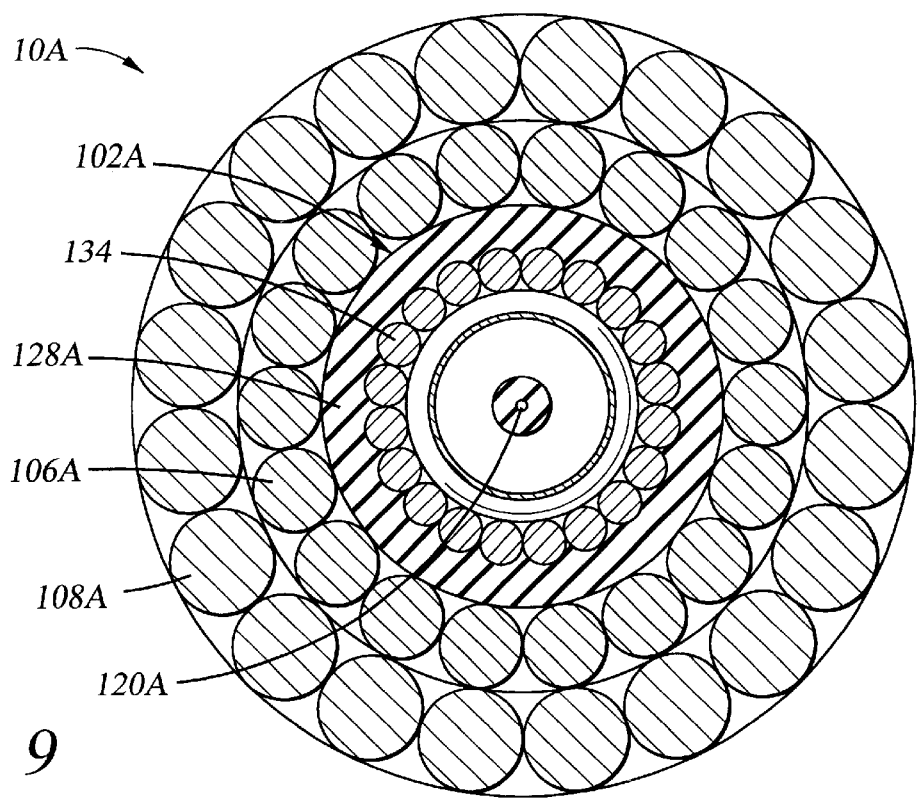
FIG. 9 shows an alternative construction for the enclosed optical fiber which has electrical conductive capacity.

An alternative construction for the enclosed optical fiber which includes electrical conductive capacity is shown at 102A in FIG. 9. The optical fiber 120A can be surrounded by a wave- or bellows-shaped corrugated tube 126A, similar to those shown in FIGS. 4 and 5. The corrugated tube 126A can be surrounded by a number of conductive strands 134 such as made from copper or the like for providing electrical conductivity to the enclosed fiber 12A. The size and number of the strands 134 will depend on the maximum external diameter of the tube 126A and the amount of conductance desired. See for example U.S. Pat. No. 5,495,547 issued to Rafie et al. The tube 26A may also be copper plated or clad on its exterior surface to improve the electrical conductivity of the overall structure. The copper strands 134 can be surrounded by an elastomeric outer jacket 128A. The jacket 128A in this embodiment of the enclosed fiber 102A should be substantially electrically non-conductive since the enclosed fiber is meant to carry electrical power and/or electrical signals along its length.

Both the first embodiment of this invention and the alternate embodiment are intended to provide a pressure-sealed, abrasion and crush resistant enclosure for an optical fiber in a well logging cable. The enclosure for the optical fiber can be elongated to the same amount as the maximum expected axial strain on the logging cable without permanent deformation of the enclosure. The enclosure for the optical fiber can also resist being crushed when the maximum expected lateral crushing force is applied to the well logging cable.

The invention has been described above with reference to well logging operations. It may, however, be utilized for other applications where significant axial strain and lateral crushing forces may be imposed on the cable. For example, the configuration of the various embodiments of the cable readily lends itself for use in seismic data acquisition, wherein a cable that may be up to 10 km. in length may be towed by a vehicle through a body of water at speeds of up to 15 knots. The axial strain on the cable due to the towing and the lateral forces are comparable to those in well logging operations.

Those skilled in the art will devise other embodiments of this invention which do not depart from the spirit of the invention as described herein. The invention should therefore be limited in scope only by the attached claims.

What is claimed is:

1. A cable comprising:
   (a) an optical fiber;
   (b) an enclosure comprising a corrugated-wall tube having a plurality of maximum diameter portions surrounding said optical fiber, said corrugations enabling an actual length of the enclosure to be greater than an axial length of the optical fiber, said enclosure being pressure sealed to exclude fluids from entering said enclosure under a hydrostatic pressure;

(c) a substantially toroidally shaped ring within each maximum diameter portion of corrugations in the wall of the tube; and (d) armor wires wound around said enclosure.

2. The cable of claim 1 wherein said optical fiber is positioned at the center of said enclosure.

3. The cable as defined in claim 1 further comprising an inner elastomeric jacket disposed outside said optical fiber and inside said tube to provide abrasion resistance to said optical fiber.

4. The cable as defined in claim 1 further comprising a chemically and thermally inert liquid filling an annular space between said fiber and said tube to prevent entry under hydrostatic pressure of fluids into said tube.

5. The cable as defined in claim 1 further comprising an outer elastomeric jacket disposed on an external surface of said tube.

6. The cable as defined in claim 5 further comprising conductive strands surround said tube and inside said outer jacket, said outer jacket surrounding said conductive strands, said outer jacket comprising a substantially electrically non-conductive material.

7. The cable as defined in claim 1 further comprising a plurality of insulated conductors wound helically in a substantially symmetric pattern within said armor wires and around said tube, said tube disposed in a central position within said pattern.

8. The cable of claim 1 wherein said fluids are in a wellbore and the cable is designed for operation within said wellbore.

9. The cable of claim 1 wherein said fluids are in a body of water and the cable is designed for being towed through such body of water.

10. The cable as defined in claim 1 wherein said enclosure has an elastic limit corresponding to a predetermined axial strain value on said cable, said enclosure adapted to withstanding crushing when a predetermined lateral force is applied to said cable.

11. The cable of claim 10 wherein the predetermined axial strain value is 1%.

12. The cable of claim 10 wherein the predetermined lateral force is 1200 pounds per inch of axial length of the cable.

13. A cable comprising:

(a) an optical fiber;

(b) an enclosure including (i) a wire helically wound around said optical fiber, said helical winding enabling an actual length of the enclosure to be greater than an axial length of the optical fiber said wire resistant to crushing thereof under a lateral force on said well logging cable, and (ii) an outer elastomeric jacket disposed on an exterior surface of said wire; said enclosure being pressure sealed to exclude fluids from entering said enclosure under a hydrostatic pressure; and (c) armor wires wound around said enclosure.

14. The cable as defined in claim 13 further comprising an inner elastomeric jacket disposed outside said optical fiber and inside said wire to provide abrasion resistance to said optical fiber.

15. The cable as defined in claim 13 further comprising a chemically and thermally inert liquid filling an annular space between said fiber and said outer elastomeric jacket to prevent entry of fluids into said tube from outside under hydrostatic pressure.

16. The cable as defined in claim 13 further comprising conductive strands surrounding said wire, said outer jacket surrounding said conductive strands, said outer jacket comprising a substantially electrically non-conductive material.

17. The cable as defined in claim 13 further comprising a plurality of electrical conductors helically wound in a substantially symmetric pattern within said armor wire, said enclosure disposed in a central position within said pattern.

* * * * *